United States Patent [19]

Okubo

[11] 4,448,491

[45] May 15, 1984

[54] IMAGE DISPLAY APPARATUS

[75] Inventor: Yukitoshi Okubo, Yokohama, Japan

[73] Assignee: Canon Kabushiki Kaisha, Tokyo, Japan

[21] Appl. No.: 175,524

[22] Filed: Aug. 5, 1980

[30] Foreign Application Priority Data

| Aug. 8, 1979 [JP] | Japan | 54-101120 |
| Aug. 10, 1979 [JP] | Japan | 54-102485 |
| Sep. 3, 1979 [JP] | Japan | 54-112645 |
| Sep. 6, 1979 [JP] | Japan | 54-114422 |
| Oct. 16, 1979 [JP] | Japan | 54-133407 |

[51] Int. Cl.³ ............................................. G02F 1/13
[52] U.S. Cl. .................................... 350/344; 350/333; 350/339 R
[58] Field of Search ............ 350/333, 334, 339 R, 350/344; 340/752

[56] References Cited

U.S. PATENT DOCUMENTS

| 3,771,855 | 11/1973 | Burns | 350/344 X |
| 3,824,003 | 7/1974 | Koda et al. | 350/333 |
| 3,863,332 | 2/1975 | Leupp et al. | 350/344 X |
| 4,150,878 | 4/1979 | Barzilai et al. | 350/344 |
| 4,213,676 | 7/1980 | Kaufmann | 350/344 X |
| 4,295,712 | 10/1981 | Ishiwatari | 350/344 |

FOREIGN PATENT DOCUMENTS

| 2837433 | 3/1979 | Fed. Rep. of Germany | 350/344 |
| 52-69644 | 6/1977 | Japan | 350/344 |
| 54-136196 | 10/1979 | Japan | 350/333 |

Primary Examiner—Jon W. Henry
Assistant Examiner—Richard F. Gallivan
Attorney, Agent, or Firm—Fitzpatrick, Cella, Harper & Scinto

[57] ABSTRACT

This invention is concerned with an image display apparatus comprising a component capable of image display by an applied voltage sandwiched between a substrate having a driving semiconductor array and a substrate having an electrode film, the substrates facing each other.

A space member, a light intercepting member, or a member functioning as both a spacer member and a light intercepting member is disposed on a non-image display portion of the apparatus. Or at least one of the substrate having the electrode film is provided with an overcoating layer and an undercoating layer.

12 Claims, 19 Drawing Figures

IMAGE DISPLAY APPARATUS

BACKGROUND OF THE INVENTION

1. Field of the Invention

This invention relates to an image display apparatus comprising a component capable of image display by an applied voltage and particularly, to an improvement in an image display apparatus comprising a driving semiconductor array integrated with a display substrate.

2. Description of the Prior Art

Image display apparatuses, in particular, liquid crystal image display apparatuses where a liquid crystal is used as a component capable of displaying images by an applied voltage, have generally the following features which active display does not have.

(1) Passive display and a very little consumption of electric power.
(2) The apparatuses can be driven by a low voltage.
(3) The apparatus can be in a form of panel.
(4) A layer scale display is possible.

This type of image display apparatus has been recently studied and developed.

For utilizing the above features, as to (1) above, a reflection type of structure which does not need an illuminating source consuming a lot of power, and as to (2) above, a liquid crystal of twisted nematic structure and a mode of a low voltage operation utilizing guest host effect.

As to (3) and (4) above, the apparatus works satisfactorily for display handling conventional relatively small amount of information, but a system capable of displaying a lot of information has been recently desired.

For example, a display apparatus capable of matrix driving many image elements as shown in U.S. Pat. No. 3,824,003 has recently attracted public attention.

A semiconductor array for driving a display apparatus as mentioned in the U.S. Patent has a substrate "S" (as shown in FIG. 1), gate lines 101a, 101a' ... composed of a thin transparent or metal conductive film which overlie the substrate, an insulating layer I and a semiconductor 102 laminated thereon. Source lines 103, 103' ... composed of a conductive film contacting the semiconductor 102 are oriented at right angles to the gate lines 101a, 101a' ... Drain electrodes 104, 104', 104'', 104''' ... which are segment electrodes are formed around intersections of gate lines and source lines.

The above mentioned semiconductor is shaped in the form of a thin film and is a driving switching element represented by thin film transistor (TFT).

Display apparatuses similar to the above ones are disclosed in IEEE trans. on Electron Devices ED-20, p. 995 (1973). A driving switching element of the display apparatus is illustrated in FIG. 2A. On a substrate S (for example, glass) is formed TFT in a form of matrix with 2–10 lines/mm. The TFT comprises gate lines 201a and 201a' formed on a substrate S, gate electrodes 201, 201', 201'', 201''' mounted on the gate lines, an insulating layer I laminated on the gate electrodes, thin film semiconductors 202, 202', 202'', 202''' formed on the gate electrodes with an intervening insulating film I, source lines 203, 203', contacting one end of the semiconductors, and drain electrodes 204, 204', 204'', 204''' contacting the other end of the semiconductors.

A counter electrode as shown in FIG. 2B is arranged facing to the substrate provided with the above mentioned trasistor array and thus an image display apparatus is constructed.

In display apparatuses, when, in particular, a liquid crystal layer is used, various states of orientation of liquid crystal molecules, and various optical detecting means such as polarizing plate, λ/4 plate, reflection plate and the like may be optionally selected depending upon a display mode selected, for example, dynamic scattering mode (DSM), twisted nematic (TN) and the like or the type of apparatus, for example, a transparent type, a reflection type and the like (In FIG. 2B, 207 stands for a counter substrate such as glass, 208 a counter electrode, 209 an insulating film, 210 a spacer and 211 a liquid crystal layer.).

The driving method is, in general, as shown below.

For example, image signals are applied to gate lines 201a, 201a', and driving voltages are applied to source lines 203, 203' by scanning (only while a signal is applied to the gate line) and thereby, the channel between sources 203, 203' and drain 204'', 204''' becomes conductive at the selected intersection.

And there is formed an electric field between the drain electrode and the counter electrode 208 and arrangement of liquid crystal molecules in liquid crystal layer 211 changes to effect display.

When a display wherein a plurality of gradations or a high speed response is required, such as display of television image signals, is effected by the above mentioned display apparatus, it is known that the operation characteristics of the display cell is very sensitive to the thickness of liquid crystal layer.

Therefore, it is necessary for obtaining good gradation or high speed response that the thickness of liquid crystal layer is made as thin as possible (for example, from several microns to 10 microns) over a certain area or more (for example, 10 cm square or more) and is made uniform.

It is known that for the purpose of keeping the thickness of liquid crystal layer constant, inert members of a certain size are incorporated in the liquid crystal, or point-like matters such as resin in a form of parallel line, circle, triangle or polygon are formed over almost all surface of the substrate.

However, such methods firstly disturb molecular arrangement of liquid crystal and lower the "appearance". In addition, it is considerably difficult to incorporate uniformly inert members in a liquid crystal. In addition, driving unstability often occurs by a short-circuit between the electrodes.

Further, since the above mentioned display cell is a passive type, there are the following disadvantages, that is, it is necessary to illuminate the display surface by an external light. Semiconductors such CdS, CdSe and the like used for TFT have a remarkable photoconductivity and therefore the external light for observation sometimes makes the operation characteristics unstable.

For solving such problem, there may be used a method of employing Te, a method of laminating a (multi-layered) reflection increasing film on the semiconductor and the like. However, in view of poisonous property, less availability of the material, complicated steps and the like, those methods are not always practical.

In addition, from a practical point of view, it is considerably difficult to manufacture an image display apparatus capable of satisfying simultaneously the above mentioned conditions (1)–(4). For example, for the purpose of effecting display by a predetermined mode such as DSM (dynamic scattering mode), twisted nematic (TN), deformation of vertical aligned phase (DAP), hybrid and the like, it is necessary to bring preliminarily liquid crystal molecules to an appropriate orientation state, and various methods are employed.

The representative methods are a method of vapor-depositing SiO or $SiO_2$ obliquely as to the substrate (oblique vapor deposition method), a method of rubbing a glass substrate, and the like.

The above mentioned oblique vapor deposition method has the following disadvantages. This method requires a large scale apparatus such as vacuum deposition apparatus, can handle only a small amount of the material per one operation and therefore the productivity is low. Further, when the thin layer is prepared, microscopic pinholes are liable to form, and electrochemical reactions occur through the pin holes.

In case of a method of rubbing a substrate, there are disadvantages that rubbing of the substrate does not always give a sufficient orientation of liquid crystal molecules and the resulting orientation state is not durable.

For the purpose of eliminating such disadvantages, an organic high polymer layer is laminated on segment electrodes on a substrate and rubbing is applied to the high polymer layer, but when the cell is sealed with a sealing material such as glass frit upon fabricating (usually heated to 300° C.), the organic high polymer is subjected to heat deterioration resulting in an insufficient orientation state.

On the other hand, as a substrate material for the cell, it is desirable to use an inexpensive glass such as alkali glass, but when such a glass is used for cells, there occurs driving unstability after a short period of time of operation. That is, when segment elements are disposed on a glass substrate, chemical decomposition reactions of liquid crystal are accelerated by impurity ions present in the glass. Or when a protecting layer composed of an organic high polymer is disposed on segment electrodes on a substrate so as to prevent such reactions, if the organic high polymer layer is made so thick that a sufficient effect can be obtained, the driving voltage applied to the electrode does not sufficiently act on liquid crystal, and the threshold voltage tends to increase and sharpness tends to be lowered or non-uniform orientation tends to occur.

Still another disadvantage of conventional image display apparatus is as shown below. When the above mentioned image display cell is made in a form of reflection type, a transparent type of a display cell can not be constructed if semiconductor 102 (in FIG. 1) is made of an opaque material because, for example, in case of FIG. 1, semiconductor 102 covers substantially the whole surface of substrate 102 in case of a display apparatus comprising a driving switching element as shown in FIG. 1. Since most of semiconductor 102 used here is opaque, a reflection type is employed.

Further, most of semiconductor 102 used here is photoconductive, and therefore, in case of a liquid crystal cell which displays images by using ambient light or illumination there is used a reflective member for the purpose of achieving the driving stability by means of a light intercepting electrode and for the purpose of effectively observing optical change of liquid crystal.

Therefore, drain electrodes 104, 104', 104'', 104''' are metal electrodes, and there occurs a mirror reflection since the thickness of cell is kept constant.

For the purpose of efficiently catching the mirror reflection as an optical change, there has been conventionally used dynamic scattering mode (DSM). However, the mirror surface structure results in formation of mirror images of lightening, external light for illumination, wall, furniture, a face of an observer on the display surface and therefore, the display effect is disturbed. In order to avoid such drawbacks, an image display apparatus is partly practically used which is operated in such a way that the image is observed from an oblique direction only and a hood of a drak color is mounted in the direction of the normal reflection.

However, this type of image display apparatus can be used for displaying numbers which usually occupy only a relatively small area, but is not preferred for a display of a brood area such as a flat panel television since it is natural to see the display from the front and such observation from the front is easy for seeing the images.

In addition, DSM has the following drawbacks, that is, DSM has a relatively high driving voltage, the driving life is shorter than that of the other electric field effect type mode, and color display is difficult. Therefore, it could be proposed to use the other mode for the cell of such mirror type, but the drawbacks of the mirror surface electrode structure is enhanced and can not be decreased even when TN mode or guest host mode is used.

In order to solve such problem, Japanese Patent Laid Open No. 54-37697 proposes a method that a substrate at the back side is treated to form a rough and uneven surface and it is used as a reflection electrode scattering light. The resulting structure has various drawbacks, that is, disconnection of the TFT structure, fluctuation of characteristics and non-uniform thickness of the liquid crystal cell.

When the display picture element electrode 204 of the driving switching element as shown in FIG. 2A is made of a reflective material such as metal, there is a drawback as mentioned above, i.e., mirror image reflection.

According to this structure, drain electrode 204 contacts semiconductor 202 and therefore this structure contacts partly an opaque portion, but it is possible from the point of view of operation that the substrate, the insulating layer and pair plates of the capacitor are composed of transparent materials. Therefore, in case of a liquid crystal display cell in the form of TFT, the display portion excluding the semiconductor portions may be composed of two substrates of a transparent material. In such a display apparatus, when it is reflection type, for example, a scattering reflection plate is fixed to the back surface of the cell, a cell of TN structure which is employed in usual clocks and portable calculators can be easily used.

However, this structure also has some drawbacks. For example, it is desirable for display that the pattern of semiconductor 202 portion is smaller than that of the display portion. Therefore, it is required that a finer pattern processing of the semiconductor is made as compared with the pattern processing of the display pattern.

When a transparent electrode is used as a drain electrode 204, there is sometimes a problem as to an ohmic contact with semiconductor 202 If a structure, i.e., semiconductor/ohmic contact member/transparent electrode, is employed so as to solve the problem, the number of step disadvantageously increases.

Apart from above, when a known transparent electrode such as indium oxide, tin oxide and the like is fabricated according to conventional methods, a high temperature step has adversely a thermal effect on the resulting semiconductor 202. In particular, when amorphous silicon is used as the semiconductor, such a light temperature step destroys the desirable characteristics.

In view of the foregoing, the liquid crystal display apparatus using TFT as shown in FIG. 2A has various problems.

SUMMARY OF THE INVENTION

It is an object of the present invention to provide a novel image display apparatus having an improved driving stability.

It is another object of the present invention to provide a display cell having a uniform layer over the whole area of the substrate and each cell having uniform characteristics.

It is a further object of the present invention to provide an image display apparatus which can give a good gradation and a high responsing property.

It is still another object of the present invention to provide an image display apparatus in which the semiconductor can be selected without limitation.

It is a still further object of the present invention to provide an image display apparatus of high durability.

It is still another object of the present invention to provide an image display apparatus capable of displaying images of high contrast.

It is a still further object of the present invention to provide an image display apparatus capable of displaying images of omnidirectivity (i.e. the displayed images can be seen from widely different directions).

According to one aspect of the present invention, there is provided an image display apparatus comprising a component capable of image display by an applied voltage sandwiched between a substrate having a driving semiconductor array and a substrate having an electrode film, these substrates facing each other, characterized in that a member capable of functioning as a spacer for keeping the distance between these substrates constant is disposed on a portion where a semiconductor of the driving semiconductor array is positioned.

According to another aspect of the present invention, there is provided an image display apparatus comprising a component capable of image display by an applied voltage sandwiched between a substrate having a driving semiconductor array and a substrate having an electrode film, these substrates facing each other which comprises a light intercepting member for intercepting a light incident upon a semiconductor portion of the driving semiconductor array.

According to a further aspect of the present invention is to provide an image display apparatus comprising a component capable of image display by an applied voltage sandwiched between a display substrate provided with a driving semiconductor array having row electrodes and column electrodes in a form of matrix and a substrate having an electrode film, these substrates facing each other, which comprises a plurality of spacer members disposed at portions on the display substrate, said portion having no image displayed.

According to still another aspect of the present invention, there is provided an image display apparatus comprising a component capable of image display by an applied voltage sandwiched between substrates facing each other, characterized in that at least one substrate has a first insulating layer, an electrode layer and a second insulating layer laminated on the substrate in this order from the substrate to the other substrate.

According to a still further aspect of the present invention, there is provided a reflective liquid crystal display apparatus comprising a liquid crystal layer sandwiched between a transparent electrode substrate and a reflective electrode substrate, these electrode substrates facing each other, the transparent electrode substrate being provided with a detector characterized in that the detector is provided with a light diffusing member and a polarizing member.

DESCRIPTION OF THE PREFERRED EMBODIMENTS

Figure 3A:
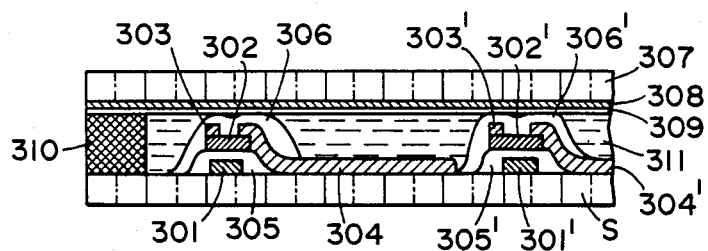
FIGS. 3A and FIG. 3B are cross sectional views of an embodiment of the present invention having spacers on members functioning as both spacer and light intercepting member, and that having light intercepting members, respectively.

FIG. 3A is a cross sectional view of an embodiment of the image display apparatus provided with a driving semiconductor array according to the present invention.

Thickness of the layer composed of a component capable of image display by an applied voltage such as, for example, liquid crystal, electrochromic material and the like (hereinafter the explanation is made as to "liquid crystal layer") 311 is set to a predetermined value depending upon the laminate structure, i.e. gate electrode 301, 301'/insulating layer 305, 305'/semiconductor 302, 302'/source electrode 303, 303' and the like.

If desired, controlling members 306, 306' are disposed on the semiconductor formed portions (portions where semiconductors are disposed) as non-image display portions so as to adjust the thickness of liquid crystal layer 311 to a predetermined thickness. As a material for the members 306, 306', there is preferably used an insulating and chemically stable material.

In particular, if the controlling members 306, 306' are composed of a light intercepting member, the driving characteristics are advantageously stabilized. That is, the feature of the display apparatus of FIG. 3A is that the portions where semiconductors are disposed function as a spacer for keeping the distance between the substrates constant.

As the light intercepting material, there is preferably used a material which is black or of dark color and has a light absorbing property and further, is chemically stable.

For example, when a light intercepting member is directly contacted with liquid crystal layer 311, semiconductor 302, 302' and the like, it is desirable to select a material of the light intercepting member which does not cause unnecessary and undesirable chemical reactions with the layer 311, semiconductor 302, 302' and the like. In practice, materials of high resistivity and good light absorption property, for example, metal oxides such as $CoO$, $MnO_2$, $V_2O_3$, $NbO_2$, $WO_3$, $MoO_3$, $TiO_2$, $CaOAl_2O_3$, $NiOAl_2O_3$, $CoOCr_2O_3$, $FeOCr_2O_3$, $MnOCr_2O_3$, $CoOFe_2O_3$, $MnOFe_2O_3$ and the like, are used in a form of a thin film produced by, for example, vapor deposition, sputtering, screen printing and the like.

Sealing member 310 serves to seal a liquid crystal layer 311 between substrates 307 and S, but it is not always necessary that the sealing member 310 functions as a spacer (e.g. 210) in the above mentioned conventional cell which functions to keep the thickness of the liquid crystal layer.

Figure 1:
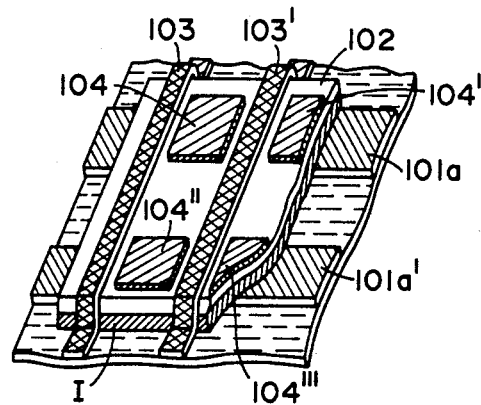
FIG. 1 and FIG. 2A are oblique views of substrates provided with conventional driving semiconductor arrays.
Figure 2A:
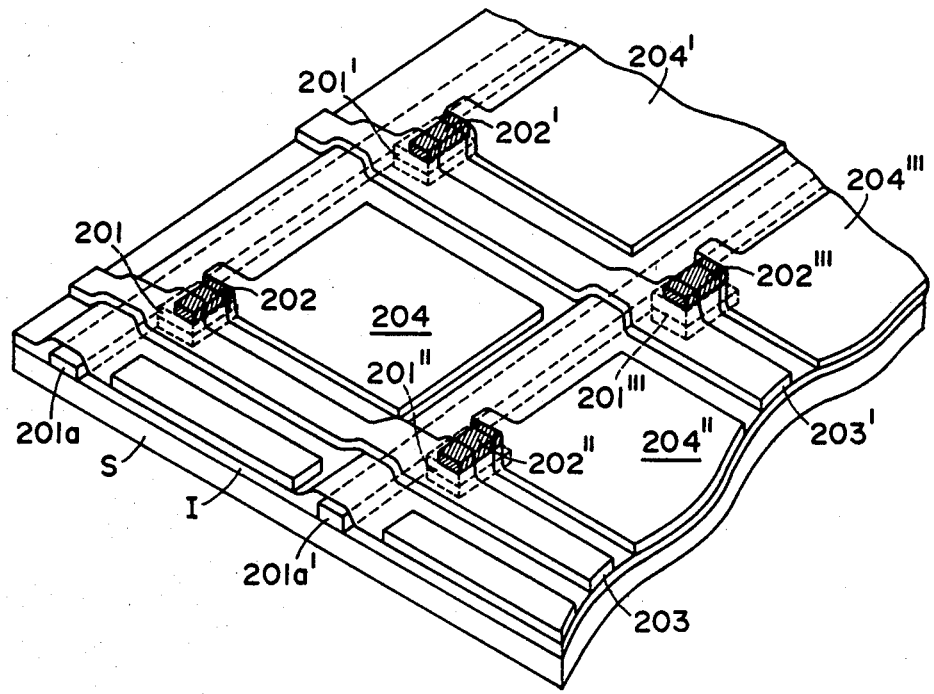

According to the present invention, the spacer is disposed at the top of each display segment (drain electrodes 204, 204', 204'', 204''') as shown in FIG. 2A, and therefore, as far as substrates 307 and S are properly pressed and contacted thereto, it is possible to retain the liquid crystal layer exactly at a definite thickness over the almost whole surface of the display apparatus. As the result, when a voltage applied to the liquid crystal layer is changed so as to effect a gradation display, it is possible to apply uniformly an electric field to all the segments where a display of a predetermined gradation is contemplated and therefore, there is produced a display of high fidelity free from irregular display.

Further, the display response time generally becomes long as the thickness of the liquid crystal layer increases, but according to the present invention, a very thin liquid crystal layer can be formed, and therefore, the response property of display is excellent.

In addition, according to the present invention, spacers are positioned at portions having no image displayed of display segments (drain electrodes 304, 304') and therefore, there hardly occurs irregular arrangement of liquid crystal molecules in the display surface and the "appearance" is not degraded and further, according to the present invention, the display apparatus, liquid crystal display cell, can be a thin structure without degradation of the "appearance".

For fabricating a thin display apparatus, it is necessary to make substrates 307 and S as thin as possible. According to the conventional methods, it is difficult to retain an exact thickness of a liquid crystal layer over a broad area where the substrates are thin, and the arrangement of liquid crystal molecules at the plane where display is effected is liable to be disturbed. According to the present invention, the image display apparatus is free from such drawbacks. Neither occurs a driving unstability due to short circuit between the electrodes.

The display apparatus of the present invention may be in a projection type, transparent type or reflection type, and the display mode may be DSM, TN, phase change mode, DAP, hybrid aligned nematic (HAN) or the like. Initial orientation of liquid crystal molecule and optical detecting means (polarizing plate λ/4 plate, reflection plate and the like) are selected depending upon the type and mode employed.

The display apparatus of the present invention may be preferably filled with a liquid crystal in such a manner that the space between substrates 307 and S is kept at a negative pressure and the liquid crystal is poured into the space by utilizing the pressure difference between the negative pressure in said space and the external atmosphere.

For example, two substrates constituting the display surface are adhered each other by means of an appropriate adhering layer such as a low melting point glass, a high polymer and the like (one of said substrates is provided with a driving semiconductor portion in a form of matrix).

The resulting structure is then provided with one port for air-exhaustion and liquid-introduction, and the inside of the structure is reduced to a pressure lower than an atmospheric pressure and then said port is soaked in a liquid crystal and thereby the liquid crystal is poured into the space between the two substrates. Or the structure is provided with at least one inlet port for introducing a liquid crystal into the structure and at least one exit port for exhausting air, and the air in the structure is exhausted through the exit port while a liquid crystal is introduced into the structure through the inlet port.

If the inside of the structure is at a slightly negative pressure when the introduction of liquid crystal is completed, the piled layer structure portion provided with a semiconductor on the substrate acts better as a spacer. Or, if an adhesive layer is formed at a surface contacting a substrate facing a piled layer structure portion provided with a semiconductor, there can be obtained a good spacer effect.

Figure 4:
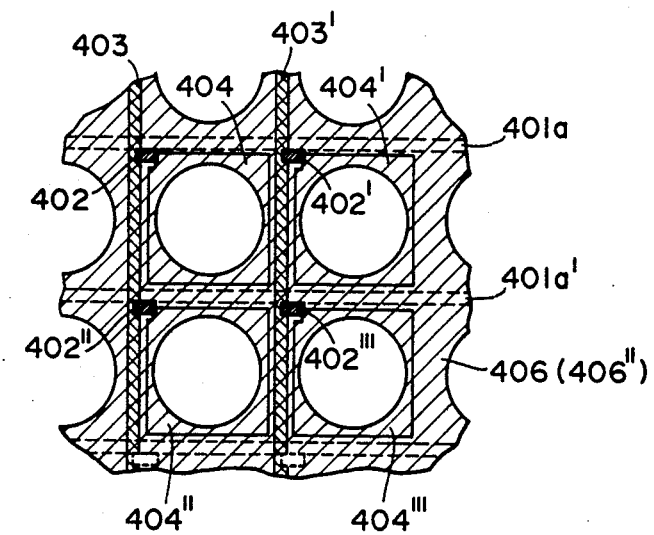
FIG. 4 is a plan view of an image display apparatus where the light intercepting member has a masking function.

FIG. 4 is a diagrammatic plan view of a display cell comprising mask members functioning as both spacer and light interceptor. In FIG. 4, the mask members are circular, but they may be in an optional form such as triangle, quadrilateral and the like.

With respect to the display mode, various modes known in the art of liquid crystal such as DSM, TN, phase change mode, and the like may be employed.

Figure 3B:
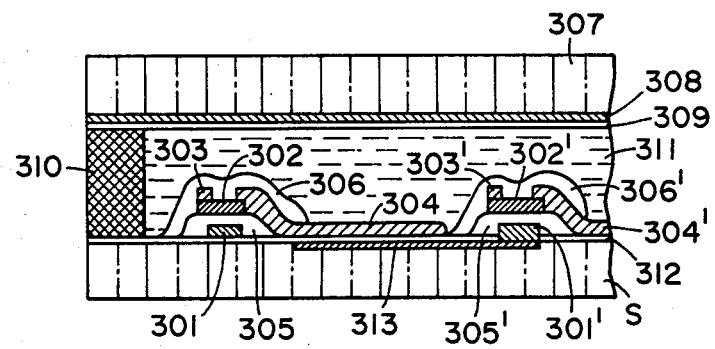

The display apparatus according to the present invention not only gives images of good contrast for a static display, but also gives a stable display of high contrast for a dynamic display such as television image where a high responsing property is required. Where a high speed response is demanded as in case of television image signals, it is desirable that the segment and a storage capacitor are connected in parallel to use as a frame memory. In this case, the cross sectional view of the display apparatus is as shown in FIG. 3B. The storage condenser is composed of the gate and the conductive film 313 extending to the portion corresponding to the drain electrode intervened with the insulating film 312.

By using the layer thickness of the portion where a semiconductor is disposed as a spacer for keeping the thickness of the liquid crystal layer constant, there can be obtained a compact liquid crystal display apparatus which has driving stability and good gradation and responsing property over a wide area. In particular, when a light intercepting member is disposed at a portion where a semiconductor is positioned and the thickness of the piled layers is utilized as a spacer, there can be obtained a practical liquid crystal display apparatus which has driving stability and the semiconductor material of which can be freely selected.

FIG. 3B illustrates another embodiment of the present invention in which the above mentioned light intercepting member is disposed at semiconductor portions of a driving semiconductor array. This embodiment can also intercept a light incident upon semiconductor portions and thereby there can be obtained a display apparatus which has stable driving characteristics.

The display apparatus according to this embodiment has light intercepting members 306, 306' on the semiconductor portions. This is different from the cell in FIG. 2A. According to this embodiment, the external light incident upon the display apparatus comes from a portion above the substrate S. However, the light intercepting members may be disposed at appropriate positions dependent upon the type of display cell, that is, projection type, transparent type, and reflection type.

According to the present invention, the purpose of the present invention can be achieved regardless of the position of the light intercepting member, that is, the light intercepting member may be positioned at any part of the display cell such as outside of the substrate and inner wall side. However, it is preferable to dispose the light intercepting member on the inner wall side of the substrate. The "inner wall side" means the inside of substrate 307 and substrate S in FIG. 3B, that is, a wall side near the liquid crystal layer 311.

As the light intercepting material, there is preferably used a material which is black or dark color and has a light absorbing property and further, is chemically stable.

For example, when a light intercepting member directly contacts liquid crystal layer 311, semiconductor 302, 302' and the like, it is desirable to select a liquid intercepting material which does not cause unnecessary and undesirable chemical reactions with them.

As the light intercepting member, there may be used a material of high light absorbing property and highly insulating property, for example, metal oxides such as $CoO$, $MnO_2$, $V_2O_3$, $NbO_2$, $WO_3$, $MoO_3$, $TiO$, $CaOAl_2O_3$, $NiOAl_2O_3$, $CoOCr_2O_3$, $FeOCr_2O_3$, $MnOCr_2O_3$, $CoOFe_2O_3$ $MnOFe_2O_3$ and the like. It is preferable to form a thin film of the metal oxide by a vapor deposition, sputtering, or screen printing method.

If there is no fear of undesirable and unnecessary chemical reactions, an organic flim capable of absorbing light or a layer in which organic pigments are dispersed may be used as a light intercepting member.

Another advantage of the display device of the present invention is that the light intercepting member can act also as a mask for concealing the non-image display portion, that is, the portion not contributive to the image display such as the semiconductor portion, source lead or gate lead. When such a mask is provided, adjacent display segments (drain electrodes 304 and 304') are mutually separated visually, and the reflectivity of the non-display portion with respect to the external light is decreased as a whole of the display device so that the contrast is enhanced relatively. In particular, when the display device is constructed into a transparent type or color type, enhancement in the contrast is remarkable.

In the present invention, more preferable results can be obtained if a light intercepting member is incorporated to the semiconductor array structure, for example it is disposed on the insulating films 305 and 305' formed under the semiconductors 302 and 302', the gate electrodes 301 and 301', the source electrode, or a portion including the semiconductor and gate electrode.

Such display apparatus not only can provide good contrast in the static display, but can perform stable display with high contrast in the dynamic display requiring high response such as images of a television. In case that high response is required as in the image signals of a television, electrical condenser is provided in parallel to each segment, and it is desired that the resulting structure is utilized as a frame memory. In this case, the condenser is composed of an electrically conductive film 313 extending from the bottom of the gate 301' to the under portion of the drain electrode 304 through insulating film 312.

In FIGS. 3A and 3B, numeral 308 denotes an electrode film formed on the opposed electrode 307, and numeral 309 designates an insulating film.

FIGS. 5A-5D illustrate another embodiment of the present inventon, which is characterized in that a plurality of spacer members are formed in the non-image display portion in the surface of the display substrate. When a plurality of the spacers are porvided in such a manner, a display cell can be easily obtained which is excellent in the gradation and response. Particularly, when the spacer members capable of acting also as the insulating layer for protection of the electrode are provided on at least one of the row electrode and column electrode, the display apparatus having excellent display characteristics can be obtained through simplified steps.

Figure 5A:
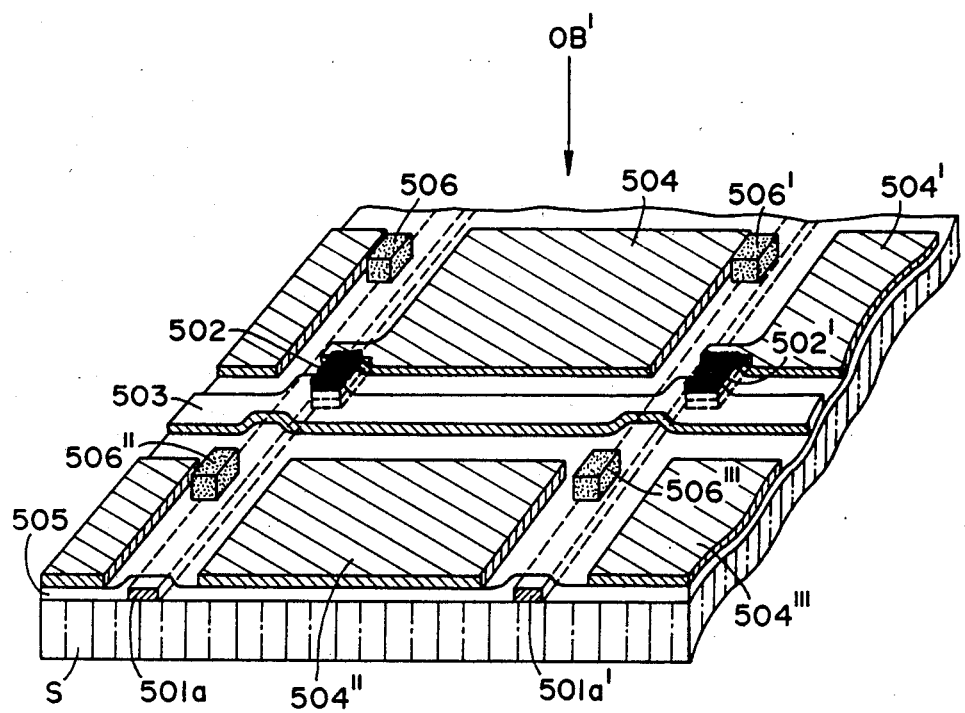
FIG. 5A is an oblique view of a substrate provided with another type of driving semiconductor array which has a spacer at a non-image display portion.

The non-image display portion in which a plurality of spacers are provided does not constitute the picture element in the display substrate surface. An example of its structure is illustrated in FIG. 5A. In the example, a plurality of spacer members 506, 506', 506" and 506''' are provided on the column (or row) electrode through insulating layer 505. The thickness of the spacer members determines the thickness of the liquid crystal layer. In that case, the thickness of the spacer is preferably larger than the sum of the thickness of the semiconductor of the driving semiconductor array, and the thickness of the source electrode in contact with the semiconductor or the thickness of the drain electrode.

Figure 5B:
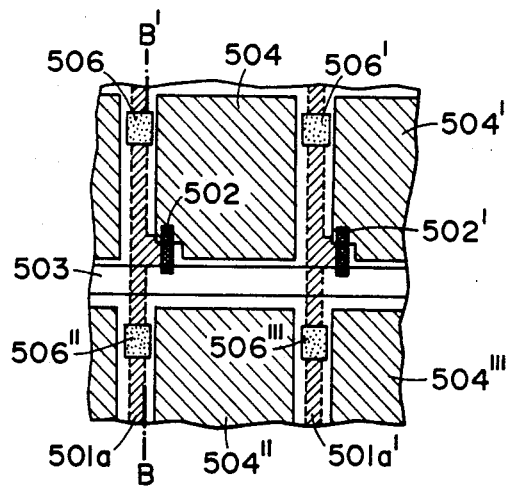
FIG. 5B is a plane view of the substrate of FIG. 5A.
Figure 5C:
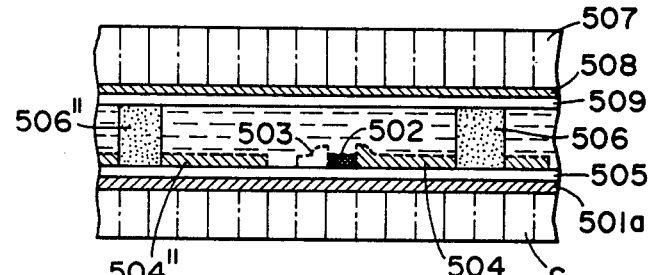
FIG. 5C is a cross sectional view of an image display apparatus provided with the above mentioned substrate.

FIG. 5B is a plane view of the substrate having the driving semiconductor array in which the column and row electrodes are formed, taken in the direction of the arrow OB' in FIG. 5A. FIG. 5C is a cross-sectional view taken along the line B—B' of FIG. 5B. In this case, the column or row electrode corresponds to either gate or source electrode.

The spacer member in this embodiment may be composed of any material as far as it is chemically stable and can be formed into a layer of a predetermined thickness. Particularly, insulating inorganic compounds are preferable, including for example, typically metal oxides such as SiO, $SiO_2$, $TiO_2$, $CeO_2$, $ZrO_2$ and the like, alkaline earth metal halides such as $MgF_2$, $CaF_2$ and the like, and nitrides containing hydrogen. The nitrides include for example silicon nitride containing hydrogen, such as $Si_3N_4$ containing hydrogen. The spacer members 506, 506', 506" and 506''' may be in any form such as for example a point, line and polygon. Further, the spacer member may be formed by vacuum deposition, sputtering or the like of a material different from the insulating layer 505 through a mask having a predetermined pattern, or may be made in such a manner that the same material as the insulating layer 505 is formed into a layer having the same thickness as the liquid crystal layer on the substrate surface and the insulating layer except for the spacer portion is partially removed by etching. The step for forming the spacer member in this manner will give extremely desirable results.

Furthermore, for the purpose of providing a predetermined gap between the substrates, chemically stable inorganic particles, for example glass particles may be caused to deposit to an adhesive layer formed in a pattern at the predetermined position to form a spacer member or adhesive member so that the gap between the substrates may be prevented from being varied.

The spacer members 506, 506', 506" and 506''' may be formed, not only on the gate leads 501a and 501a', but also at any position of the portion in the display surface which does not constitute the picture element. For example, it may be provided on the source lead 503 or both source and gate leads.

Figure 5D:
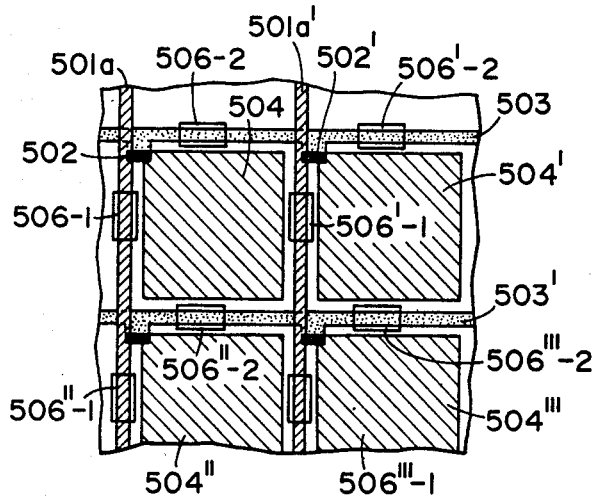
FIG. 5D is a plane view of a substrate provided with another type of driving semiconductor array having a spacer disposed at a non-image display portion.

FIG. 5D is a plane view of an example wherein the spacer members are provided on the gate leads 501a, 501a' and source leads 503, 503'. Reference numerals 506-1, 506'-1, 506"-1 and 506'''-1 denote the spacer members formed on the gate leads, while numeral 506-2, 506'-2, 506"-2 and 506'''-2 designate the spacers provided on the source leads.

For typical example, glass substrates of 0.5 mm in thickness are used, and one spacer member is disposed per one $cm^2$, thereby obtaining a display cell having a gap of $4\mu$ between the substrates and a surface area of 100 $cm^2$.

When the spacer member is disposed on the source lead 503, short circuit due to mutual contact of the opposed electrodes can be prevented even if only very small gap is formed between the substrates. This will be clear from FIG. 5C. As a result, the driving stability can be improved.

If the liquid crystal layer can be kept uniform in the thickness, it is not always necessary to dispose the spacer for each drain electrode 504, 504', 504" or 504''' constituting the segment.

Figure 2B:
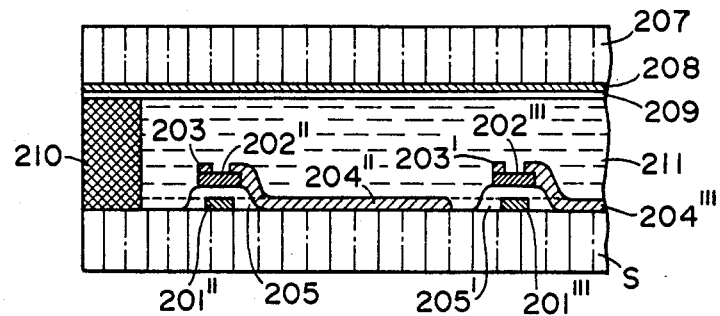
FIG. 2B is a cross section of a conventional image display apparatus.

The present invention using the spacer member can keep the gap between the substrates constant over large surface area as compared with the prior art disposing the sealing member only at the periphery portion of the substrate. Further, in the prior art, the sealing member 210 in FIG. 2B must function as a spacer for keeping the gap between the substrates constant and simultaneously act as a sealing material for stopping the liquid crystal. Therefore, the prior art has many drawbacks. For example, choice of material for the sealing member is susceptible to restriction; if the substrate is made thinner, it is liable to deform, and therefore it is hardly possible to keep the gap between the substrates as very small as $4-10\mu$; since the sealing member is apt to deform, the gap between the substrates is liable to become uneven partially within the substrate surface of each cell thereby causing irregularity in the display characteristics; and the level of the gap between the substrates is apt to fluctuate in each display cell. On the contrary, every drawback can be eliminated in the present invention.

A still another embodiment of the present invention is a liquid crystal display cell having a liquid crystal layer sandwiched between opposed substrates which is characterized in that a first insulating layer, an electrode layer and a second insulating layer are laminated on at least one of the substrates.

This embodiment provides a display cell having no defects and being uniform in properties over the entire surface of the substrate. Such display cell is advantageous in that influence of impurity ions of the substrate can be reduced, desired orientation state of the liquid crystal molecule can be retained for a long period of term, the cell can be easily produced, and low-cost materials can be utilized.

Figure 6:
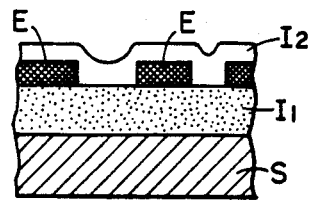
FIG. 6 is a cross sectional view of a part of a substrate of an image display apparatus according to the present invention.

In the display device of the present invention, one substrate constituting the cell may be composed of at least four layers, i.e. a substrate base, a first insulating layer, an electrode layer for a display segment or an opposed electrode layer, and a second insulating layer. This structure is schematically illustrated in FIG. 6.

The first insulating layer $I_1$ and second insulating layer $I_2$ should be called undercoat layer and overcoat layer, respectively, laminated on the substrate base S. The substrate for cell having the electrode layer E for display segment or opposed electrode sandwiched between both insulating layers in very excellent in the driving stability of the cell and durability.

In case that the first insulating layer $I_1$ and second insulating layer $I_2$ are composed of the same material, only if a material having good adhesion property to the material of the insulating layers is selected as that for the electrode layer, the resulting structure becomes very stable mechanically and chemically.

The thickness of the first and second insulating layers may be determined so that the desired properties may be obtained. Particularly, the first insulating layer is generally 1000 Å—$5\mu$, preferably 1500 Å—$1\mu$, more preferably 2000–5000 Å in the thickness. The second insulating layer is generally 100–2000 Å, preferably 200–1500 Å, more preferably 500–1000 Å in the thickness.

The insulating layers $I_1$ and $I_2$ may be formed from any material which is capable of providing a uniform, transparent inorganic thin layer free from pin hole etc. when coated by various coating methods, for example dipping, spinner and spray methods. The material for the insulating layers includes, for example, aliphatic ester of silicic acid and silicon halide. These compounds are advantageous in that they can yield easily a uniform silicon oxide layer by a simple treatment such as hydrolysis, heat treatment (75° C. or above, preferably 200° C.–400° C.) or the like. More particularly, $Si(OR)_4$ wherein R is alkyl having up to 4 carbon atoms, condensate of it and $SiHnX_{4-n}$ wherein X is halogen and n is an integer of 0–3 may be exemplified. Above all, condensates of $Si(OR)_4$, aliphatic ester of silicic acid are particularly preferable. These condensates may be represented by the following formulas:

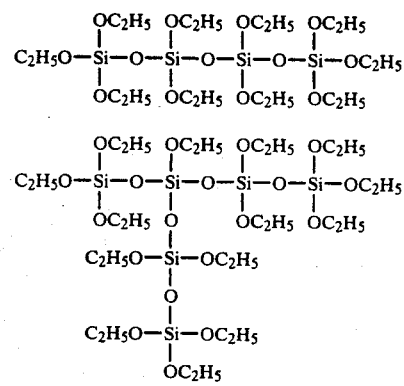

Even if the insulating layer composed of the above-mentioned materials is placed under severe conditions adopted in forming a display segment of a predetermined form, including vacuum deposition for fabricating a metal or transparent oxide electrode, contact with an etching liquid, heating treatment and the like, the deterioration and degradation of the layer constituting material do not occur so that a stable substrate for display cell can be obtained. Further, when a material having a high melting point such as glass frit seal is used in sealing the liquid crystal cell, deterioration and degradation due to the heat treatment do not take place, and also when an organic adhesive is used as the sealing material, its affinity to the insulating layer is good so that firm adhesion can be effected.

In the step to form an insulating layer, only if the concentration of a solution of a material for forming the insulating layer as well as the speed of coating the material solution are controlled without necessity of a particular apparatus, the predetermined thickness of the insulating layer can be obtained easily. Among the coating methods, the spinner coating method is advantageous in that the substrate having a uniform, exact thickness can be mass-produced by simplified apparatus and operation. In the spinner coating method, if the number of revolution of the material to be treated, concentration of the solution and the like are governed, a uniform and exact layer can be easily obtained.

In the display cell of the present invention, if a driving switching element (semiconductor such as TFT, SOS and the like) is provided in each of many segment electrodes arranged in a matrix form, good results can be obtained, particularly in the driving stability and response.

Figure 7A:
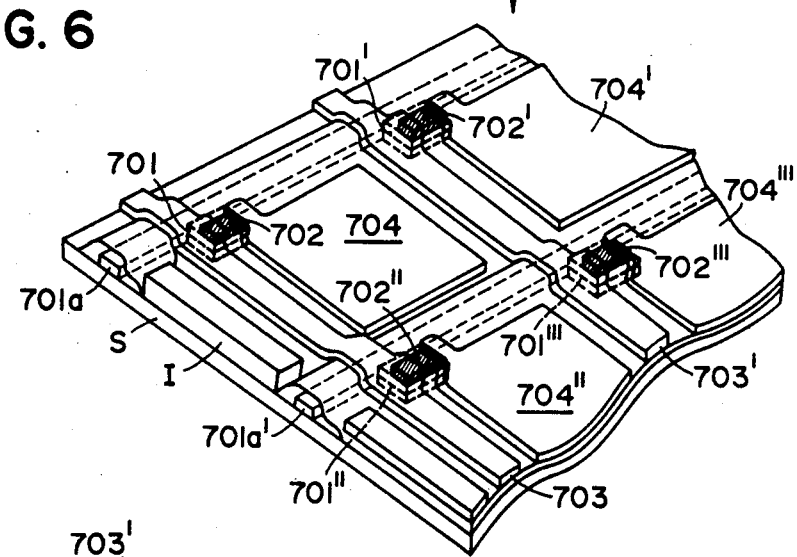
FIG. 7A and FIG. 7B are an oblique view and a cross sectional view of a substrate provided with a driving semiconductor array, respectively.

Such a device comprises driving thin film transistors (TFT) arranged on a substrate, made of for example glass, for constituting the cell, in a matrix form with a high density, for example of two-several tens/mm, as shown in FIG. 7A. The thin film transistor may be constructed with gate leads 701a and 701a' composed of transparent or metal layers of electroconductivity and formed on the substrate S, gate electrodes 701, 701', 701'' and 701''' provided on the gate leads, insulating layers I laminated on the electrodes, semiconductors 702, 702', 702'' and 702''' in thin layers formed above the gate electrodes through the insulating layers, source leads 703 and 703' composed of electrically conductive layers and formed in contact with one end of the semiconductors, and drain electrodes 704, 704', 704'' and 704''' provided in contact with the other end of the semiconductors. Although not shown in this drawing, an insulating layer may be formed on the substrate.

Figure 7B:
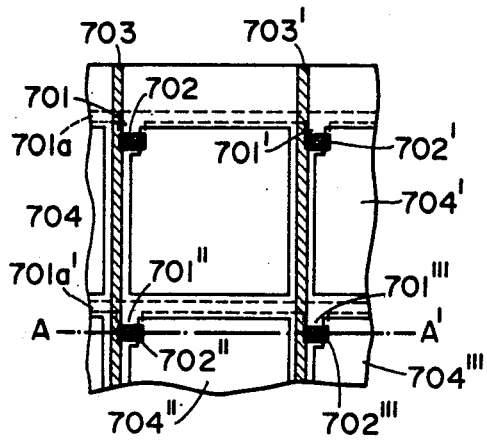

FIG. 7B is a plane view of FIG. 7A taken in the direction of the arrow OB, illustrating a part of the matrix driving circuit.

Figure 7C:
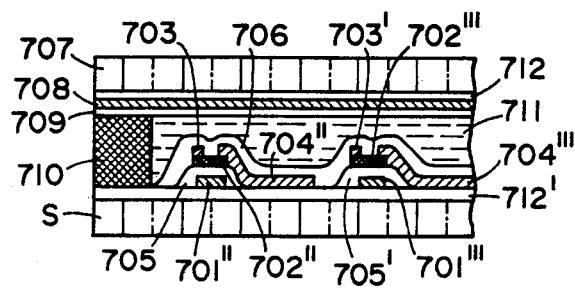
FIG. 7C is a cross sectional view of an image display apparatus provided with the above mentioned substrate.

FIG. 7C is an enlarged cross-sectional view of FIG. 7B taken along the line A—A'. In FIG. 7C, numeral 701 and symbol S denote substrates made of for example glass, 704'' and 704''' drain electrodes and 708 opposed electrode. Transparent electrically conductive layers made of for example In$_2$O$_3$ and SnO$_2$ may be used as members 704'', 704''', 708, and in some cases, thin metal layers made of for example Au, Al and Pd may be employed. Numerals 701'' and 701''' designate gate electrodes, and 703 and 703' source leads, and these electrodes and leads may be composed of a metal such as Al, Au, Ag, Pt, Pd, Cu or the like. Numerals 705, 705', 706, 709, 712 and 712' denote insulating layers, 702'' and 702''' semiconductors such as CdS, CdSe and the like, 710 spacer, and 711 liquid crystal layer. Particularly, first insulating layers are denoted by 712 and 712', and second insulating layers by 706 and 709.

Now, image signal is applied to gate leads 701a and 701a', and driving voltage is allowed to scan and applied to source leads 703 and 703'. At that time, application of the driving voltage is carried out only while the image signal is being applied to the gate leads. As a result, electric conduction takes place between the source (e.g. 703, 703') and drain (e.g. 704'', 704''') as selected from apparent intersections of those electrodes so that voltage is then applied between the drain electrode and opposed electrode 708. Consequently, the orientation state of the liquid crystal molecule in the liquid crystal layer 711 is changed to perform display.

The display cell of such a constitution comprises many layers of various materials laminated in a pattern with very high density, and therefore its driving characteristics, durability, yield and the like depend greatly upon many factors including diffusion of impurities from alkali glass substrate, point defect, line defect, defect of the pattern end portion, mutual affinity of the materials, uniformity of the layers, and the like. However, in the present invention, the driving switching element such as the electrodes, semiconductors and the like formed in a fine pattern is sandwiched by the first and second insulating layers, and consequently, the above-mentioned drawbacks hardly occur and good results can be obtained in the driving characteristics of the cell, durability, yield and the like. Particularly excellent results can be obtained when the first and second insulating layers are composed of the same material.

Moreover, the present invention is advantageous in widened degree of freedom of selecting the material constituting the substrate for the display cell provided with the driving semiconductor array with high density. For example, when a metal is used as the material for the substrate, many advantages may be mentioned, that is, that metal substrate can be utilized as a shield for protecting the display cell from various noises, and consequently the driving stability in the dynamic display is enhanced; the metal substrate can be used as a common electrode of the electric condenser formed in parallel to the condenser in the display portion provided between the drain electrode and opposed electrode for performing the display for a predetermined period of time; the strength is large with respect to mechanical deformation and therefore the thickness of the substrate can be made small; and it is utilized as an integrally formed case for display cell.

As for the case wherein the substrate is composed of an electrically resistant material, if the driving temperature is lower than the range of the liquid crystal temperature for the liquid crystal, the substrate can be used as a heater for temperature control in such a manner that current is allowed to pass through the substrate.

Furthermore, when a high molecular material is used as the material for the substrate, the cost of the material is inexpensive, mass-production can be satisfactorily carried out, and the display cell can be formed into a mold type in a simplified manner.

The invention will be understood more readily by reference to the following examples. However, these examples are intended to illustrate the invention and are not to be construed to limit the scope of the invention.

EXAMPLES

A glass substrate was dipped into each of solutions having various compositions as shown in Table 1 and then withdrawn from the solution at a speed of 1.5 mm/sec., 3.0 mm/sec., and 5 mm/sec. The substrate was treated by heating at 300° C. for 20 minutes to thereby form an insulating layer of $SiO_2$. A condensate of ethyl silicate (supplied by Nippon Colcoat Chemical Co. under the tradename "Ethyl Silicate 40") was used as the material for forming the insulating layer. In preparing the solutions $l_1$, $l_2$ and $l_3$, ethanol and ethyl acetate were added to the above compound, and further a small amount of hydrochloric acid (catalyst for hydrolysis) and water were added.

Figure 8:
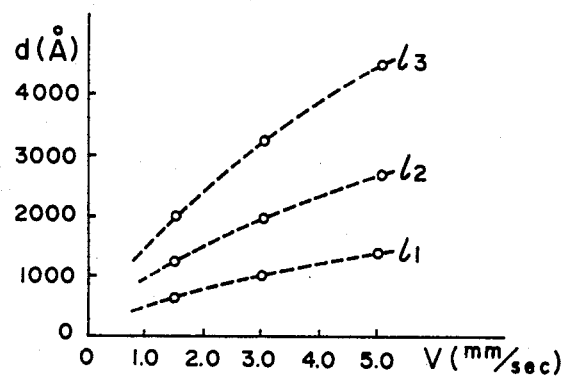
FIG. 8 is a graph showing a relation among concentration of a solution, pulling-up speed and thickness of an insulating layer.

FIG. 8 shows the thickness "d" of the insulating layers formed when the substrate was withdrawn from the three kinds of solutions $l_1$, $l_2$ and $l_3$ shown in Table 1 at different speeds V.

A voltage of 5 V was applied to the liquid crystal cell (TN mode, cell thickness of 20μ) composed of insulating layers having various thicknesses and substrate provided with the switching element as shown in FIG. 7, and after lapse of predetermined period of time, the orientation state, contrast and change in the threshold voltage were examined. The results are shown in Table 2.

In addition, the liquid crystal cell was constructed in such a manner that a biphenyl type liquid crystal (tradename: E-7, supplied by BDH Chemical Co.) was sandwiched between substrates made of for example alkali glass provided with $In_2O_3$ electrode layer of 1000 Å in thickness in a stripe form so that the liquid crystal may become twisted arrangement and the resulting structure is further sandwiched between polarizing plates.

In Table 2, the "after bake" column shows heating temperature and period of time in sealing the cell. When the heating temperature is 100° C. and 150° C., a thermosetting epoxy seal is used, and when the heating temperature is 400° C., a glass frit seal is employed.

COMPARATIVE EXAMPLES 1-4

In Comparative Examples 1 and 2, liquid crystal cells were prepared by using a substrate which was obtained in a similar manner to that in the above Examples except that either the first insulating layer or the second insulating layer was formed. The same examination as that in the Examples was carried out.

In comparative Examples 3 and 4, a similar procedure to that in the above Examples was repeated except that either the first insulating layer or the second insulating layer is formed of polyethylene. The same test as in the Examples was carried out.

The results in the comparative examples are also shown in Table 2.

The display cell of the present invention exhibited good properties (orientation state, contrast, threshold voltage and the like) at normal temperature (15°-30° C.) even after lapse of about two years. Particularly, Examples 4, 5 and 7-9 gave excellent results.

TABLE 1

|  | Composition (Volume ratio) | | |
| --- | --- | --- | --- |
|  | Solution l1 | Solution l2 | Solution l3 |
| Ethyl silicate 40 | 12 | 18 | 25 |
| Ethanol | 40 | 37 | 34 |
| Ethyl acetate | 39 | 36 | 32 |
| 1/20 diluted hydrochloric acid | 1 | 1 | 1 |
| Water | 8 | 8 | 8 |

TABLE 2

|  | Undercoat Thickness (Å) | Overcoat Thickness (Å) | After bake Temp. (°C.) | After bake Time (min.) | Initial state | Heating, 80° C. 48H | Heating, 80° C. 120H | Heating, 100° C. 48H |
| --- | --- | --- | --- | --- | --- | --- | --- | --- |
| Example No. | | | | | | | | |
| 1 | 500 | 500 | 100 | 30 | ◉ | ○ | ○ | △ |
| 2 | 1000 | 500 | " | " | ◉ | ◉ | ○ | △ |
| 3 | 1000 | 1000 | " | " | ◉ | ◉ | ○ | △ |
| 4 | 2000 | 1000 | " | " | ◉ | ◉ | ◉ | ○ |
| 5 | 3000 | 1000 | " | " | ◉ | ◉ | ◉ | ◉ |
| 6 | 1000 | 500 | 150 | 30 | ◉ | ◉ | ○ | △ |
| 7 | 3000 | 1000 | " | " | ◉ | ◉ | ◉ | ◉ |
| 8 | 3000 | 1000 | 400 | 30 | ◉ | ◉ | ◉ | ◉ |
| 9 | 5000 | 800 | " | " | ◉ | ◉ | ◉ | ◉ |
| Comparative Example | | | | | | | | |
| 1 | — | 1000 | 100 | 30 | ◉ | △ | X | X |
| 2 | 2000 | — | " | " | ◉ | △ | X | X |
| 3 | — | 1000 | " | " | △ | X | X | X |

TABLE 2-continued

| Undercoat Thickness (Å) | Overcoat Thickness (Å) | After bake Temp. (°C.) | After bake Time (min.) | Initial state | Heating, 80° C. 48H | Heating, 80° C. 120H | Heating, 100° C. 48H |
|---|---|---|---|---|---|---|---|
| 4 | 2000 | — | 400 | 30 | X | X | X | X |

Note:
◯ Good
◐ Partially poor in driving
△ Remarkably poor in driving
X Extremely bad In the present invention without using a particular apparatus, uniform protecting layers can be formed and liquid crystal cells with excellent properties can be obtained as shown in Table 2.

The display apparatus of the present invention is particularly useful when driving switching element (semiconductor represented by TFT and the like) is provided in each of many segment electrodes arranged in a matrix form. It is desirable that the display apparatus is applied to various display panel such as for example portable calculator and timepiece, flat panel television, and the like.

A still further embodiment of the present invention is concerned with a reflective liquid crystal display apparatus comprising a liquid crystal layer sandwiched between a transparent electrode and a reflective electrode, both electrodes facing each other. The transparent electrode is provided with a light diffusing member and polarizing member so that the fourth drawback in the foregoing can be eliminated.

The light diffusing member may be formed into a form of a plate, film or layer. Such member may be composed of for example a transparent substrate made of glass, plastics or the like subjected to mat treatment, a transparent substrate made of glass, plastics or the like coated with a dispersion of light diffusing particles having different refractive index in a binder, or crystalline plastics such as crystalline polyethylene and the like.

The polarizing member may also take various forms such as a plate, film and layer forms. Such member may be composed of for example a laminate of a polyvinyl butyral base and a material prepared by dispersing iodine in polyvinyl alcohol and carrying out the centrifugal treatment to attain the orientation of the iodine, a dyed film similar to the above laminate but using dichroic dye in place of the iodine (this film being generally called "H film"), or a laminate of a polyvinyl butyral base and a material prepared by applying the centrifugal treatment to vinyl chloride to effect removal of hydrochloric acid (this being generally called "K film").

Figure 9A:
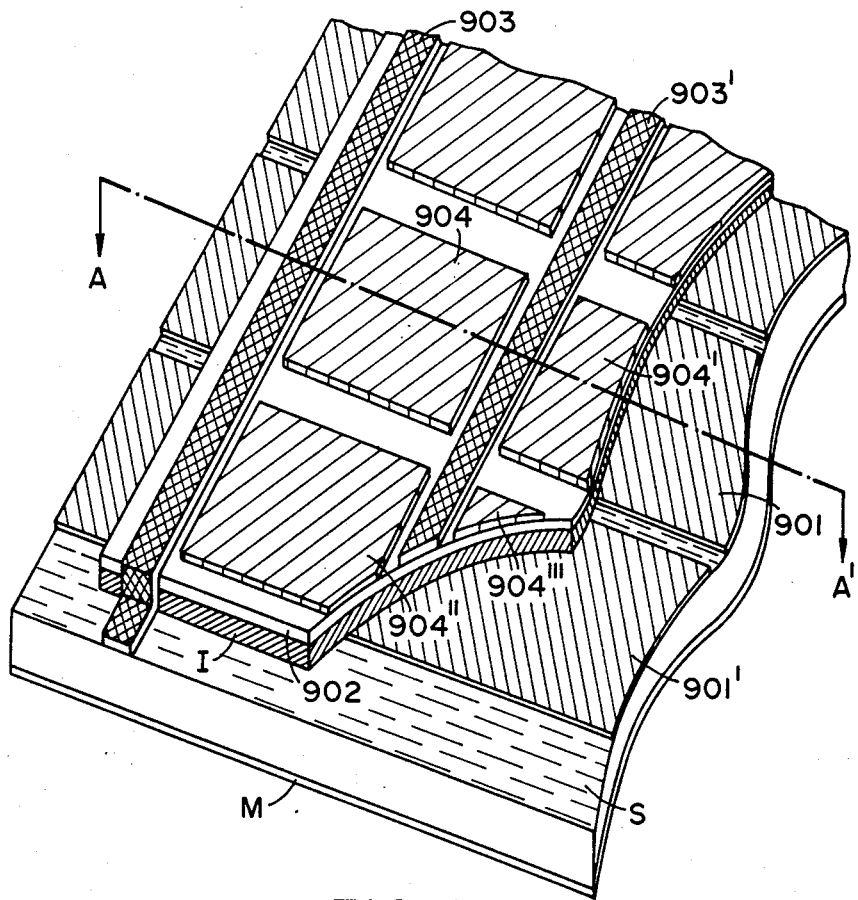
FIG. 9A is an oblique view of a substrate provided with a driving semiconductor array according to a further embodiment of the present invention.

According to a preferable example of the present invention, as shown in FIG. 9A, the width of the gates 901 and 901' is made larger, the surface area of the drains 904, 904', 904" and 904'" are relatively increased, a mirror surface metal member having an increased effective display surface is used, and the substrate S is provided with a mirror surface layer M of the same material at the back side.

Figure 9B:
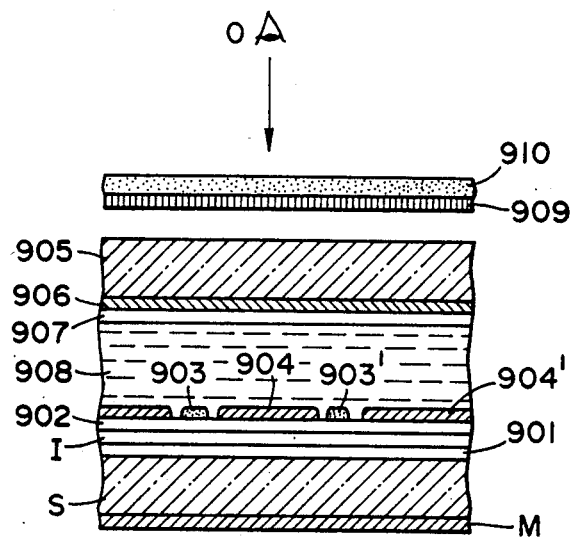
FIG. 9B is a cross sectional view of an image display apparatus provided with the above mentioned substrate.

FIG. 9B is a cross-sectional view of an example of the present invention including a substrate provided with a thin film transistor as viewed along the line A—A' of FIG. 9A. A gate lead 901 (901' . . . ) is formed in a stripe form on the substrate S, and an insulating layer I is further laminated.

A semiconductor layer 902 is formed on the entire surface of the insulating layer. Source leads 903, 903' . . . are further formed in a fine stripe form so that they are in ohmic contact with the semiconductor 902. The source leads are arranged so as to be allowed to intersect the gate leads. Drain electrodes 904, 904' . . . are formed in the vicinity of the source leads 903, 903' . . . above the gate leads 901, 901' . . . .

On the other hand, as an electrode substrate opposed to the drain electrodes 904, 904' . . . , a substrate prepared for example by forming a transparent electrically conductive layer 906 on the whole surface of a substrate 905 is provided above the structure including the drain electrodes through a spacer (not shown). A liquid crystal layer 908 containing a dichroic dye is sandwiched therebetween so that a matrix (liquid crystal) display cell is completed.

Numeral 907 denotes an optional insulating layer which may be formed also at the side of the substrate having the thin film transistor (TFT) array.

Further, an orientation film (not shown) for allowing array of the liquid crystal molecule at the initial stage where no voltage is applied may be arbitrarily formed on the surface in contact with the liquid crystal.

A mirror surface layer M having the same reflectivity as that of the drain electrodes 904, 904' . . . is formed on the back side of the substrate S.

Numeral 909 denotes a polarizing plate, and 910 a light diffusing layer. These can act as a detector, and are preferably arranged so as to be close to the liquid crystal layer 908 as far as possible. Therefore, the polarizing plate 909 may be brought into contact with the substrate 905.

The driving principle of the display apparatus of the present invention having such a structure will be given. In the liquid crystal layer 908, there is a change of two states of the liquid crystal molecule when a voltage is applied and when no voltage is applied. One is a state in which the long axes of the liquid crystal molecules are perpendicular to the substrates S and 905, the other is a state in which the long axes of the molecules are parallel to the substrates and arranged in the same direction. When the liquid crystal has positive dielectric anisotropy, the liquid crystal molecules are arranged at the initial stage so that the long axes of the molecules may be in parallel to the substrates while no voltage is applied, but may become perpendicular to the substrates at the time of applying a voltage. As for the liquid crystal having negative dielectric anisotropy, the molecules are arranged at the initial state so that the long axes thereof may be perpendicular to the substrates when no voltage is applied, but may become parallel to the substrates at the time of applying a voltage. When there are liquid crystal molecules oriented perpendicularly to the substrates, the dichroic dye contained in the liquid crystal layer is also oriented perpendicularly to the substrates. In this case, there is no or little absorption of light. On the other hand, when the liquid crystal and dye become parallel to the substrates, light is absorbed so that coloration can be observed in accordance with the absorption wavelength. The most efficient absorption can be obtained when the orientation direction of the dye in parallel state and the polarizing direction of the polarizing plate 909 agree with each other. Therefore, the polarizing plate is disposed preferably so that its polarizing surface may agree with the molecule axis of the dye in parallel state.

For convenience, the above description is made only with respect to two states of ON and OFF in the optical change. However, in the system utilizing the liquid crystal layer 908 containing a dichroic dye, the liquid crystal layer 908 can exhibit optical change quantity of a middle level with respect to an input voltage of a middle value. Therefore, this means that gradation can be expressed in such system. The observer O can make discrimination only by this state change. However, since the drain electrodes 904, 904', . . . and the mirror surface layer M disposed at the back surface form a reflected image of the background, the discrimination often becomes difficult. In the present invention, for the purpose of removing the reflected image, the light diffusing layer 910 is disposed. This light diffusing layer can remove the reflected image but is transparent to change in the light quantity caused by the drain electrodes 904, 904', . . . and may have relatively weak light scattering ability. Further, the light diffusing layer should be preferably made close to the liquid crystal layer 908 for the purpose of facilitating clear discrimination of the optical change in the liquid crystal layer 908. This embodiment is illustrated in FIG. 9C.

In this drawing, the substrate at the side of the observer is composed of a glass plate having very small thickness, a transparent electrode 906 and insulating layer 907 formed on one side of the plate, and a polarizing film 909 and light diffusing member 910 formed on the other side of the plate. In this structure, the light diffusing member 910 can prevent the glass plate being deformed, and the polarizing plate 909 can be made close to the liquid crystal layer in contact with the insulating layer 907.

Figure 9C:
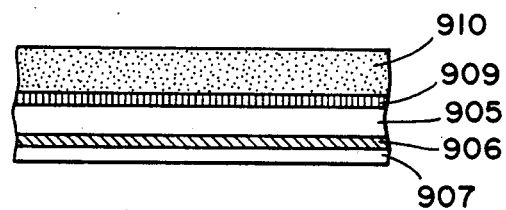
FIG. 9C and FIG. 9D are cross sectional views of detector which may be used in an embodiment of the present invention.
Figure 9D:
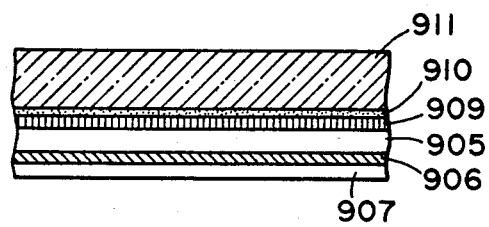

In a structure as illustrated in FIG. 9D, a similar electrode to the electrode 906 in FIG. 9C is formed on one side of the substrate 905 composed of a thin glass plate, a polarizing film 909 is disposed on the other side of the substrate, and a light diffusing layer 910 is provided on the polarizing film, and further a deformation preventing member 911 is laminated on the light diffusing layer. Such a structure can prevent the optical change portion on the drain electrode from becoming blurred as the thickness of the light diffusing layer 910 increases and the light diffusing layer is made apart from the liquid crystal layer (not shown) disposed at the side of the insulating layer 907.

The most appropriate blur is one of advantages of the present invention, thereby apparently alleviating separation between the picture elements. However, the light diffusing layer is used for the purpose of removing the reflected image, and therefore even if the polarizing film 909 and light diffusing layer 910 are exchanged in the positions, similar display effect can be obtained. However, since the light diffusing layer deteriorates more or less the polarizing property of the polarizing film, it is not necessary to adopt positively the above arrangement. Particularly when the light diffusing layer 910 should be desirably made close to the liquid crystal layer, such an arrangement is adopted, which is covered by the present invention.

The essential effect of the present invention resides in that the display effect of the panel having the TFT array wherein the drain electrode is of a mirror surface is sufficiently enhanced, and the TFT array structure has many advantages in that the drain electrode structure of a mirror surface is used.

That is, as shown in FIGS. 9A and 9B, the drain electrodes 904, 904', . . . for constituting a sufficiently large picture element can be formed on the greater portion of the surface of the semiconductor 902 except for the source leads 903, 903', . . . . This is largely different in the display effect from the case in which the transparent type cell is constructed with a structure as illustrated in FIG. 2A. In the latter case, the portion of the semiconductor 202 does not contribute the picture element and decreases the effective display surface. This effect of the invention is particularly important when the electrode of the picture element is made minute. This will be easily understood from the comparison to the case of FIG. 2A wherein the transistor constituting portion is required to be an extremely minute pattern. In the device including the mirror surface structure according to the present invention, patterning of the semiconductor 902 is unnecessary; and with respect to the pattern accuracy only accuracy of gap between the source lead and drain electrode may be taken into account. Therefore, such device greatly contributes uniformity of the characteristics, enhancement in the reliability, reduction in manufacturing steps, reduction in the cost, and the like. Further, the drain electrode of a mirror surface provides perfect light intercepting effect with respect to the semiconductor 902 and is advantageous in that the driving stability is enhanced. In addition, the drain electrode provided with a mirror surface allows light to go in and return from the liquid crystal layer 908 by the mirror surface reflection and attain efficient absorption of the light to the dichroic dye in comparison to the transparent type structure. Therefore, for the purpose of obtaining the same absorption quantity as that in the transparent type structure, only the half of the adding amount of the dye in the transparent type structure is enough for that purpose. When the dye is used in the same amount as that in the transparent type structure, the absorption effect becomes two times as large as the absorption obtained in the transparent type structure. Furthermore, in case of the transparent type display, since a transparent, electrically conductive film is used, it is required to take the ohmic contact with the semiconductor into account. On the contrary, in case of the drain electrode composed of a metal film provided with a mirror surface, a relatively wide variety of materials can be selected as a material yielding the ohmic contact.

The dichroic dye used in the present invention includes for example anthraquinone type dye, azo dye, and merocyanine dye.

The liquid crystal display device of the abovementioned constitution is excellent in the producibility, yield, appearance of display, driving stability and the like. Also, it gives display effect which can be easily seen and is suitable for expression of gradation. Further, the optical structure used in the present invention including the reflection electrode at the back side, dichroic dye, cell structure of transparent electrode, polarizing plate and light diffusing plate is useful in a normal display apparatus of the guest-host mode which is not accompanied by TFT array. This is also within the scope of the present invention.

As the component capable of image display by an input voltage which is used in the present invention, there may be mentioned electrochromic materials in addition to liquid crystals.

The substrate used in the present invention may be composed of for example glass. The drain electrode and opposed electrode may be composed of a transparent, electrically conductive layer made of for example $In_2O_3$ or $SnO_2$, or may be formed of a metal film of Au, Al, Pd or the like. The gate and source electrodes may be composed of a metal such as for example Al, Au, Ag, Pt, Pd, and Cu. As the semiconductor, known materials such as CdS, CdSe, Te and the like may be employed.

What I claim is:

1. A display apparatus comprising: a first substrate having a driving thin film transistor array including a plurality of gate lines insulated from each other, thin film semiconductors isolated from the gate lines by an insulating layer, source lines contacting said thin film semiconductors and insulated from said gate lines, and drain electrodes contacting said thin film semiconductors and serving as picture elements and a second substrate having a counter electrode film, said substrates facing each other, whereby display by an electro-optical change generated between said two substrates may be performed, and wherein a plurality of separate thin films, each covering only a small portion of the total area of said apparatus, are disposed between the first substrate and the second substrate, and are arranged along at least one of said gate lines and said source lines as spacers formed by forming a film of an insulating material different from said insulating layer on at least one of said first and second substrates and then etching said film of the insulating material to form a plurality of said spacers.

2. The display apparatus of claim 1, wherein the insulating material is a metal oxide.

3. The display apparatus of claim 2, wherein the metal oxide is selected from the group consisting of SiO, $SiO_2$, $CeO_2$, $ZrO_2$, CoO, $MnO_2$, $V_2O_3$, $NbO_2$, $WO_3$, $MoO_3$, $TiO_2$, $CaOAl_2O_3$, $NiOAl_2O_3$, $CoOCr_2O_3$, $FeOCr_2O_3$, $MnOCr_2O_3$, $CoOFe_2O_3$ and $MnOFe_2O_3$.

4. The display apparatus of claim 1, wherein the insulating material is an alkaline earth metal halide.

5. The display apparatus of claim 1, wherein the spacers are disposed at a rate of at least one spacer per square centimeter of area.

6. The display apparatus of claim 1, wherein a liquid crystal is placed between the first substrate and the second substrate.

7. The display apparatus of claim 6, wherein the liquid crystal is nematic.

8. The display apparatus of claim 7, wherein the liquid crystal is twisted nematic.

9. The display apparatus of claim 1, wherein the thin film semiconductor is composed of CdS, CdSe, Te or amorphous silicon.

10. The display apparatus of claim 9, wherein the thin film semiconductor is composed of amorphous silicon.

11. A display apparatus as in claim 1, wherein the contact between the thin film semiconductor and said source line, and the contact between said thin film semiconductor and said drain electrode are ohmic contacts.

12. The display apparatus of claim 11, wherein the thin film semiconductor is composed of amorphous silicon.

* * * * *

UNITED STATES PATENT AND TRADEMARK OFFICE
CERTIFICATE OF CORRECTION

PATENT NO. : 4,448,491
DATED : May 15, 1984
INVENTOR(S) : YUKITOSHI OKUBO

It is certified that error appears in the above-identified patent and that said Letters Patent is hereby corrected as shown below:

```
Column  2, line  1, change "trasistor" to --transistor--
Column  2, line 20, change "sources" to --source--
Column  2, line 26, change "wherein" to --where--
Column  3, line 12, between "as" and "vacuum" insert --a--
Column  4, line 11, change "drak" to --dark--
Column  5, line  6, change "light" to --high--
Column  6, line 25, change "plan" to --plane--
Column  8, line 53, change "plan" to --plane--
Column  9, line 63, change "flim" to --film--
Column 10, line 35, change "inventon" to --invention--
Column 10, line 38, change "porvided" to --provided--
Column 12, line 35, change "in" (first occurrence) to --is--
Column 15, line 29, change "$1_1$, $1_2$ and $1_3$" to --$l_1$, $l_2$ and $l_3$--

Column 15, line 35, change "$1_1$, $1_2$ and $1_3$" to --$l_1$, $l_2$ and $l_3$--

Table 1, line 37, change "11, 12 and 13" to --$l_1$, $l_2$ and $l_3$--
```

Signed and Sealed this

Twenty-fifth Day of December 1984

[SEAL]

Attest:

GERALD J. MOSSINGHOFF

Attesting Officer

Commissioner of Patents and Trademarks